US012762713B2

(12) United States Patent
Carl, III et al.

(10) Patent No.: US 12,762,713 B2
(45) Date of Patent: Oct. 13, 2026

(54) OBJECT AND SWARM DETECTION, TRACKING, AND CHARACTERIZATION SYSTEM

(71) Applicant: Booz Allen Hamilton Inc., McLean, VA (US)

(72) Inventors: John Alvin Carl, III, Yorktown, VA (US); Michael Stinger, McLean, VA (US); Kevin Uher, McLean, VA (US); Brian C. O'Connor, Campbell Hall, NY (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 331 days.

(21) Appl. No.: 18/541,402

(22) Filed: Dec. 15, 2023

(65) Prior Publication Data

US 2024/0212168 A1 Jun. 27, 2024

Related U.S. Application Data

(60) Provisional application No. 63/477,048, filed on Dec. 23, 2022.

(51) Int. Cl.
*G06T 7/20* (2017.01)
*G01S 17/89* (2020.01)
(Continued)

(52) U.S. Cl.
CPC ................ *G06T 7/20* (2013.01); *G01S 17/89* (2013.01); *G06V 10/44* (2022.01); *G06V 10/82* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 8,515,126 B1 | 8/2013 | Medasani et al. | |
| 8,965,044 B1 | 2/2015 | Owechko et al. | |

(Continued)

FOREIGN PATENT DOCUMENTS

| | | |
|---|---|---|
| CN | 115327568 A | 11/2022 |
| KR | 102452044 B1 | 10/2022 |
| WO | 2017164453 A1 | 9/2017 |

OTHER PUBLICATIONS

Jun'an et al., "Armored target extraction method based on linear array LiDAR of terminal sensitive sub-ammunition", Infrared and Laser Engineering, vol. 48, No. 3, Mar. 2019, 8 pages.

(Continued)

*Primary Examiner* — Michelle M Entezari Hausmann
(74) *Attorney, Agent, or Firm* — Buchanan Ingersoll & Rooney PC

(57) ABSTRACT

Embodiments relate to a detection system. The detection system includes a light detection and ranging (LIDAR) module configured to scan a swarm of objects to generate image data of a first object associated with a swarm. The detection system includes an image processing module configured to process the image data and control the at least one LIDAR module. The image processing module is configured to: detect presence of a first object; detect a feature of a first object for which the presence has been detected; characterize, using image processing, a feature of a first object; and initiate, based on the characterization of a feature, the LIDAR module to any one or combination of track a first object for which the presence has been detected or scan a swarm to generate image data of a second object associated with a swarm.

20 Claims, 11 Drawing Sheets

(51) Int. Cl.
*G06V 10/44* (2022.01)
*G06V 10/82* (2022.01)

(56) References Cited

U.S. PATENT DOCUMENTS

| | | | | |
|---|---|---|---|---|
| 9,858,947 | B2 | 1/2018 | Hearing et al. | |
| 10,690,772 | B2 | 6/2020 | Van Voorst | |
| 10,787,258 | B2 | 9/2020 | Apostolopoulos | |
| 11,794,895 | B2 * | 10/2023 | Volkart | B60R 25/257 |
| 12,374,073 | B1 * | 7/2025 | Robinson | G06V 10/803 |
| 12,547,689 | B2 * | 2/2026 | Schei | G06F 21/32 |
| 2007/0003141 | A1 | 1/2007 | Rittscher et al. | |
| 2007/0092110 | A1 * | 4/2007 | Xu | G06T 7/248<br>382/103 |
| 2019/0049560 | A1 | 2/2019 | Chattopadhyay et al. | |
| 2019/0293766 | A1 * | 9/2019 | Vladutescu | G01S 17/89 |
| 2020/0220887 | A1 * | 7/2020 | A.K. | H04L 67/12 |
| 2021/0222383 | A1 * | 7/2021 | Lohr | E01F 13/12 |
| 2021/0373173 | A1 | 12/2021 | Ozaslan | |
| 2022/0051576 | A1 * | 2/2022 | Ray | G08G 5/22 |
| 2022/0155452 | A1 | 5/2022 | Rawat et al. | |
| 2022/0324572 | A1 * | 10/2022 | Alzahrani | B64U 10/25 |
| 2023/0090281 | A1 * | 3/2023 | Kurtz | G02B 13/06<br>359/725 |
| 2023/0206695 | A1 * | 6/2023 | Dagan | G01S 17/66<br>382/181 |
| 2023/0324521 | A1 * | 10/2023 | Droz | G01S 7/4817<br>356/5.01 |
| 2024/0248477 | A1 * | 7/2024 | Weinheber | G05D 1/86 |

OTHER PUBLICATIONS

Thomas et al., "An architecture for sensor modular autonomy for counter-UAS", Proceedings of Spie, vol. 10802, Feb. 26, 2023, 21 pages.

Bender et al., "Tracking Honey Bees Using LIDAR (Light Detection and Ranging) Technology", Sandia Report, [Retrieved from the internet at: https://www.osti.gov/servlets/purl/808625] , 2003. (20 pages).

Garbo et al., "Moving Object Detection in Heterogeneous Conditions in Embedded Systems", Sensors, [Retrieved from the internet at: https://pdfs.semanticscholar.org/7ba6/ac1b769ad7098037c07a5b7399fe9d97fcc8.pdf], Jul. 1, 2017. (25 pages).

International Search Report and Written Opinion of the International Searching Authority (Forms PCT/ISA/220, PCT/ISA/210 and PCT/ISA/237) issued on May 23, 2024, by the ISA/US in corresponding International Application No. PCT/US 23/84216. (8 pages).

* cited by examiner

OBJECT AND SWARM DETECTION, TRACKING, AND CHARACTERIZATION SYSTEM

CROSS-REFERENCE TO RELATED APPLICATIONS

This patent application is related to and claims the benefit of priority of U.S. provisional patent application No. 63/477,048, filed on Dec. 23, 2022, the entire contents of which is incorporated herein by reference.

FIELD

Embodiments relate to a detection system that can detect, track, and characterize objects that are part of or associated with a swarm, as well as detect, track, and characterize aspects of the swarm itself.

BACKGROUND INFORMATION

Known systems of object detection focus on detecting, tracking, and characterizing the object, but fail to assess aspects of a swarm to which the object is associated. When objects make up a swarm, the swarm itself becomes an entity. The swarm can include features, exhibit behaviors, and perform operations that are separate and distinct from those of the individual objects comprising the swarm. Thus, it can be just as important to assess the swarm in addition to the objects comprising the swarm.

In addition, a swarm can exhibit emergent behaviors. An emergent behavior is something that is a nonobvious side effect of bringing together a new combination of capabilities—whether related to goods or services. Emergent behaviors can be very difficult to foresee until they manifest themselves. Known systems are not capable of detecting, tracking, or characterizing emergent behaviors in swarms. Known system can be appreciated from CN115327568 to Li et al., KR 10-2452044 to Sin et al., U.S. Pat. No. 9,858,947 to Hearing et al., U.S. Ser. No. 10/690,772 to Van Voorst, U.S. Ser. No. 10/787,258 to Apostolopoulos, US 20190049560 by Chattopadhyay et al., US 20210373173 by Ozaslan, US 20220155452 by Rawat et al., WO 2017/164453 by Jung, Jun'an, et. al. "Armored target extraction method based on linear array LiDAR of terminal sensitive sub-ammunition", and Thomas, P. A., Marshall, et al. "An Architecture for Sensor Modular Autonomy for Counter-UAS".

SUMMARY

Embodiments can relate to a detection system. The detection system can include at least one light detection and ranging (LIDAR) module configured to scan a swarm of objects to generate image data of a first object associated with a swarm. The detection system can include at least one image processing module configured to process the image data and control the at least one LIDAR module. The at least one image processing module can be configured to detect presence of a first object. The at least one image processing module can be configured to detect a feature of a first object for which the presence has been detected. The at least one image processing module can be configured to characterize, using image processing, a feature of a first object. The at least one image processing module can be configured to initiate, based on the characterization of a feature, the at least one LIDAR module to any one or combination of track a first object for which the presence has been detected or scan a swarm to generate image data of a second object associated with a swarm.

Embodiments can relate to a detection system. The detection system can include at least one controller. The detection system can include at least one sensing assembly. The at least one sensing assembly can include at least one sensor device configured to scan an area to detect a swarm of objects and transmit a swarm detection signal to the controller. The at least one sensing assembly can include at least one light detection and ranging (LIDAR) sensor device configured to receive a control signal from the at least one controller to direct an optical pulse at a swarm based on a swarm detection signal. At least one the LIDAR sensor device can be configured to scan a swarm to generate image data of a first object associated with a swarm. The at least one the LIDAR sensor device can be configured to detect presence of a first object. The at least one the LIDAR sensor device can be configured to detect a feature of a first object for which presence has been detected. The at least one the LIDAR sensor device can be configured to characterize, using imaging processing, a feature of a first object. The at least one the LIDAR sensor device can be configured to, based on the characterization of the feature, track a first object for which the presence has been detected or scan a swarm to generate image data of a second object associated with a swarm.

Embodiments can relate to a swarm detection and countermeasure system. The swarm detection and countermeasure system can include at least one controller. The swarm detection and countermeasure system can include at least one sensing assembly. The at least one sensing assembly can include at least one sensor device configured to scan an area to detect a swarm of objects and transmit a swarm detection signal to the at least one controller. The at least one sensing assembly can include plural light detection and ranging (LIDAR) sensor devices, at least one LIDAR sensor device configured to receive a control signal from the at least one controller to direct an optical pulse at a swarm based on a swarm detection signal. The at least one LIDAR sensor device can be configured to scan a swarm to generate image data of a first object associated with a swarm. The at least one LIDAR sensor device can be configured to detect presence of a first object. The at least one LIDAR sensor device can be configured to detect a feature of a first object. The at least one LIDAR sensor device can be configured to characterize, using image processing, a feature of a first object. The at least one LIDAR sensor device can be configured to, based on the characterization of the feature, track a first object or scan a swarm to generate image data of a second object associated with a swarm. The at least one controller can be configured to process movement data from the plural LIDAR sensor devices to identify a formation. The at least one controller can be configured to process movement data to predict behavior of at least one object, a subset of objects associated with a swarm, and/or all of the objects associated with a swarm. The at least one controller can be configured, via an automated reasoning technique, to develop a countermeasure that will disrupt a formation and/or a predicted behavior.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein.

DETAILED DESCRIPTION

Figure 1:
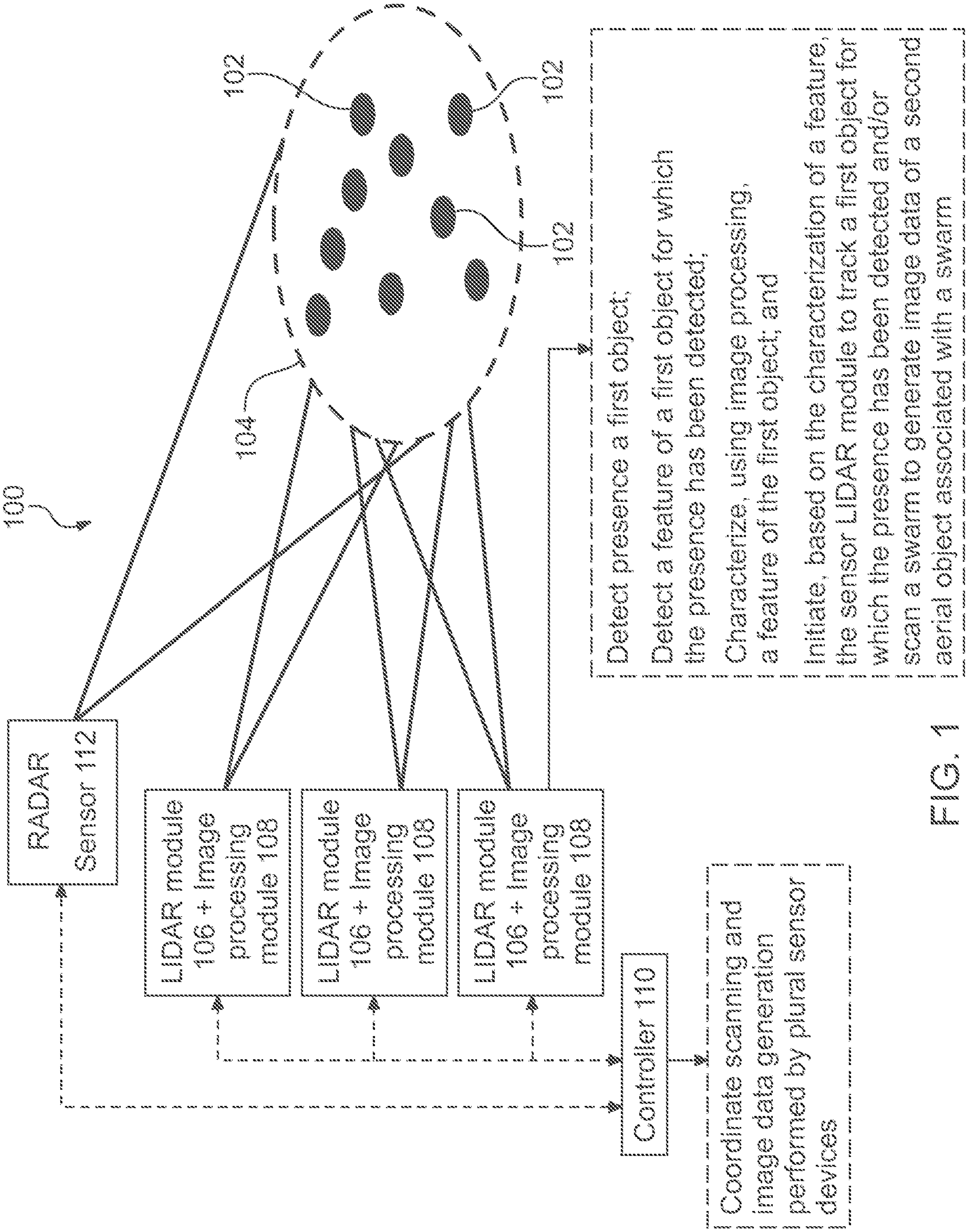
FIG. 1 shows an embodiment of a detection system and exemplary operational aspects of components of the system.
Figure 2:
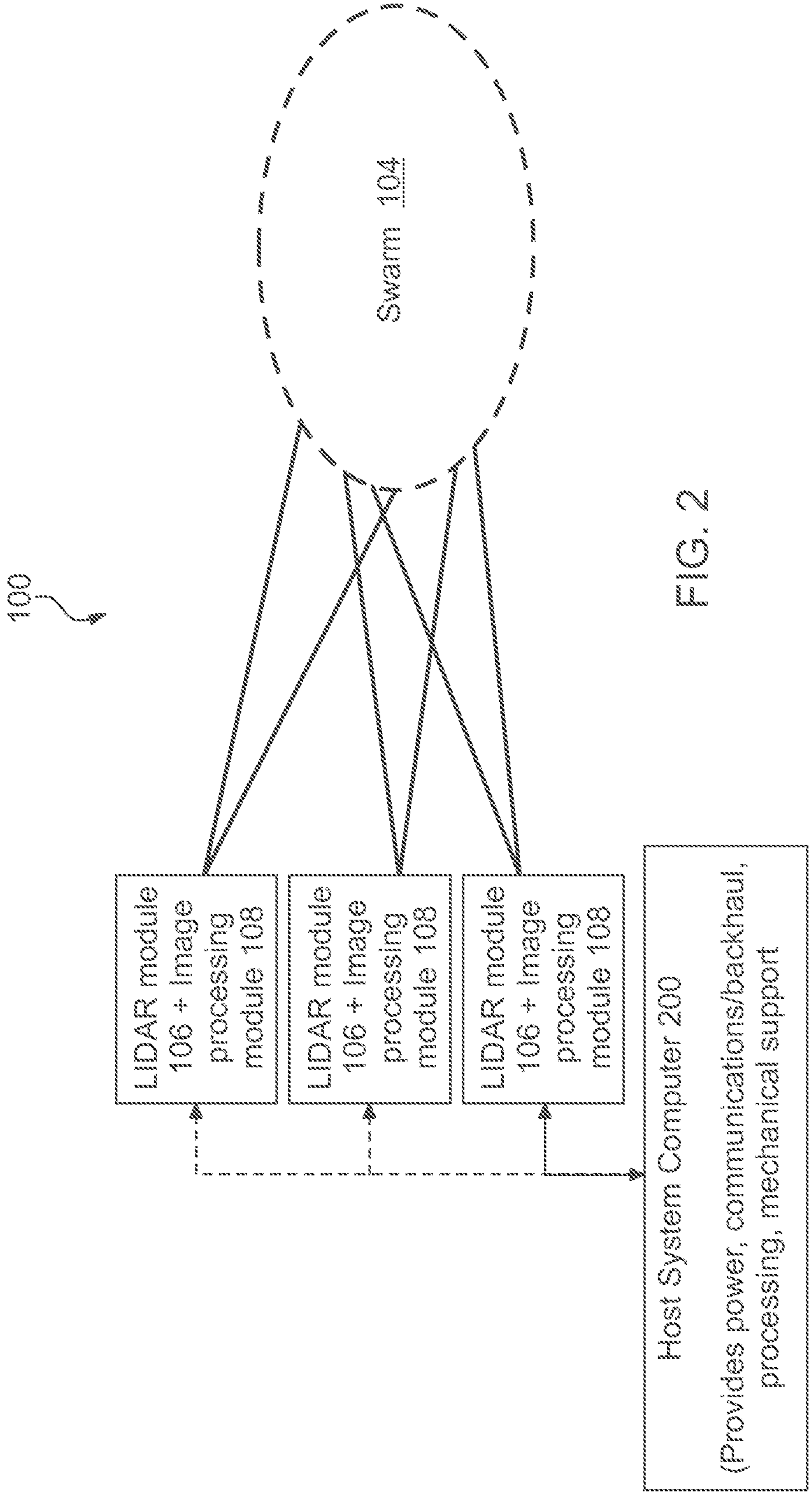
FIG. 2 shows an embodiment of a detection system in communication with a host system computer.
Figure 3:
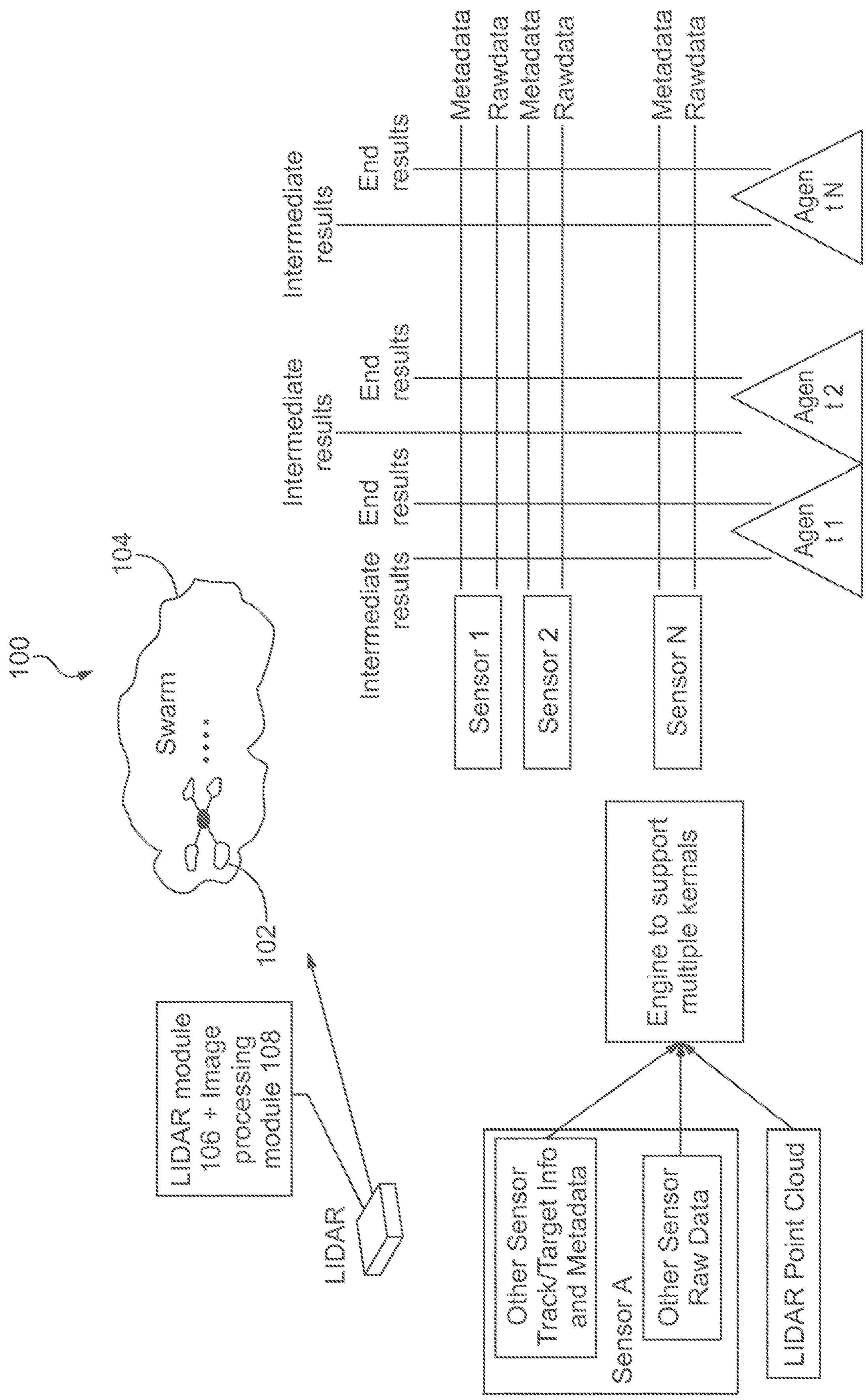
FIG. 3 shows another embodiment of a detection system illustrating use of metadata, raw sensor data, and cloud point data.
Figure 4:
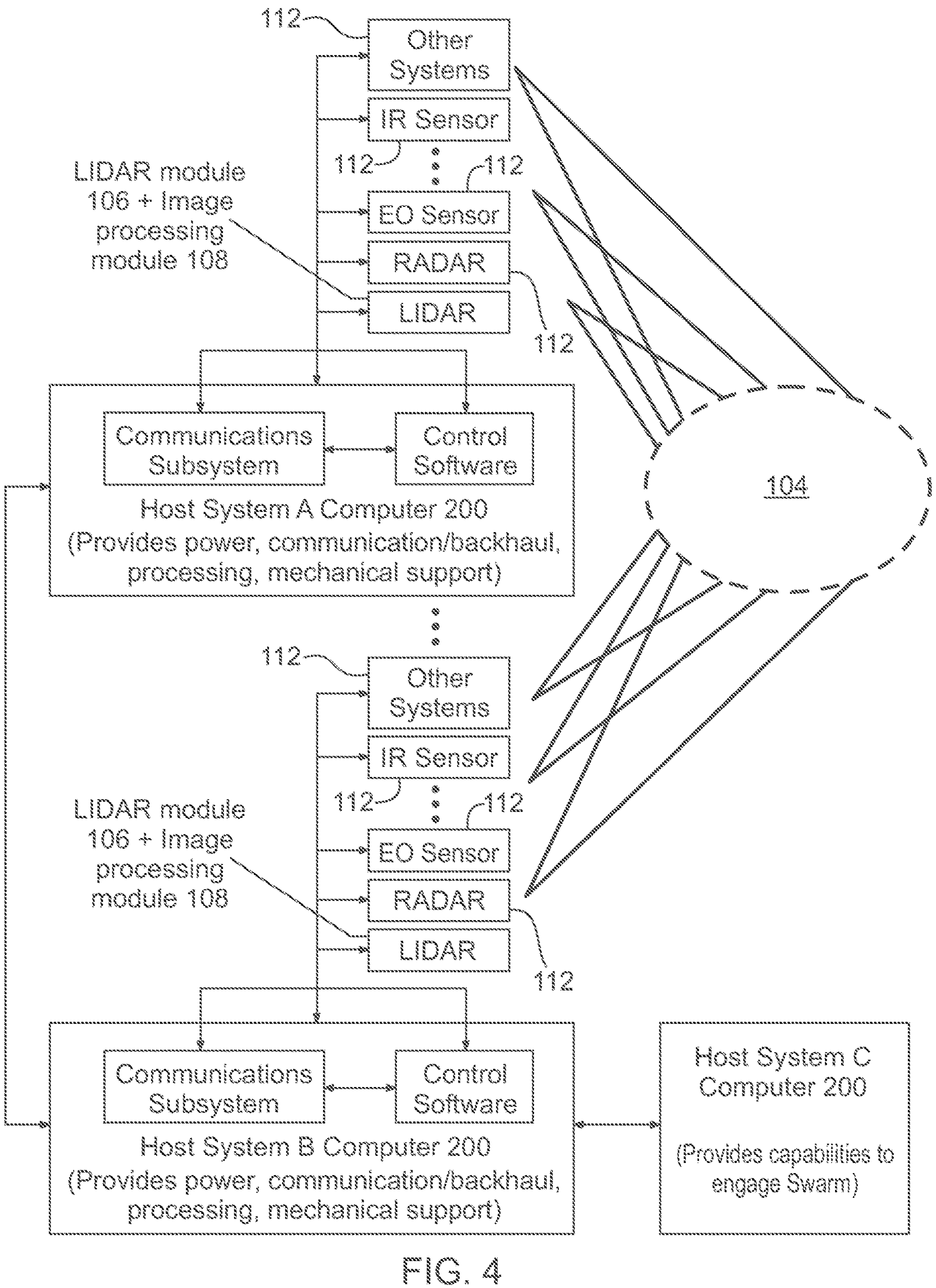
FIG. 4 shows an exemplary embodiment of two detection systems, each having a host computer system, wherein both are in communication with a third host computer system.

Referring to FIGS. 1-4, embodiments can relate to a detection system 100. The detection system 100 can be configured to assess (detect, track, and characterize) objects 102 associated with one or more swarms 104. The objects 102 can be manually operated, semi-autonomous, and/or autonomous units that act in concert or in some orchestrated way such that the compilation of them exhibit a behavior is distinct from the individual behaviors of each object 102. The behavior of any one or combination of each object 102 may be the same or different from the behavior of the swarm 104, but the behavior of the swarm 104 is separate and distinct from that of any one or combination of objects 102. A swarm 104 is a plurality of objects 102 associated with each other, which can include being in communication with each other, acting in concert with each other, acting in an orchestrated manner, acting together to achieve a one or more objectives, etc. Behavior of an object 102 or a swarm 104 can include movement (e.g., motion or non-motion), position, altitude, pitch, roll, yaw, formation (e.g., wedge formation, column formation, echelon formation, herring-bone formation, line abreast formation, vee/vic formation, trail formation, arrowhead formation, axe formation, etc.), whether a formation is being formed, whether a formation is being broken, whether an object 102/swarm 104 is engaging or breaking contact, whether an object 102/swarm 104 is responsive to a perturbation, how an object 102/swarm 104 responds to a perturbation, etc. Any one or combination of objects 102 of a swarm 104 can be a robot, vehicle, craft, etc. Any one or combination of objects 102 of a swarm 104 can be a marine, aerial, space, and/or ground object 102—meaning it can operate in or on water, air, space, and/or ground. The swarm 104 can include one or more sub-sets of swarms 104.

The detection system 100 can be used for a security, a surveillance, and/or an intelligence system. Embodiments disclosed here may describe the detection system 100 being used as part of a weapon system, but it is understood that it can be used for any system in which detection, tracking, and/or characterization is/are sought.

Any one component (light detection and ranging (LIDAR) module 106, image processing module 108, controller 110, etc.) of the detection system 100 can include or be in communication with one or more processors. In addition, the detection system 100 itself, or any component thereof, can be in communication with one or more processors 200 (e.g., processor, processing module, computer device (e.g., laptop computer, desktop computer, mainframe computer, etc.), etc.).

Any of the processors disclosed herein can be part of or in communication with a machine (e.g., a computer device, a logic device, a circuit, an operating module (hardware, software, and/or firmware), etc.). The processor can be hardware (e.g., processor, integrated circuit, central processing unit, microprocessor, core processor, computer device, etc.), firmware, software, etc. configured to perform operations by execution of instructions embodied in computer program code, algorithms, program logic, control logic, data processing program logic, artificial intelligence programming, machine learning programming, artificial neural network programming, automated reasoning programming, etc. The processor can receive, process, and/or store data related to the image data of an object 102 or a feature of an object 102, for example.

Any of the processors disclosed herein can be a scalable processor, a parallelizable processor, a multi-thread processing processor, etc. The processor can be a computer in which the processing power is selected as a function of anticipated network traffic (e.g., data flow). The processor can include any integrated circuit or other electronic device (or collection of devices) capable of performing an operation on at least one instruction, which can include a Reduced Instruction Set Core (RISC) processor, a CISC microprocessor, a Microcontroller Unit (MCU), a CISC-based Central Processing Unit (CPU), a Digital Signal Processor (DSP), a Graphics Processing Unit (GPU), a Field Programmable Gate Array (FPGA), etc. The hardware of such devices may be integrated onto a single substrate (e.g., silicon "die"), or distributed among two or more substrates. Various functional aspects of the processor may be implemented solely as software or firmware associated with the processor.

The processor can include one or more processing or operating modules. A processing or operating module can be a software or firmware operating module configured to implement any of the functions disclosed herein. The processing or operating module can be embodied as software and stored in memory, the memory being operatively associated with the processor. A processing module can be embodied as a web application, a desktop application, a console application, etc.

The processor can include or be associated with a computer or machine readable medium. The computer or machine readable medium can include memory. Any of the memory discussed herein can be computer readable memory configured to store data. The memory can include a volatile or non-volatile, transitory or non-transitory memory, and be embodied as an in-memory, an active memory, a cloud memory, etc. Examples of memory can include flash memory, Random Access Memory (RAM), Read Only Memory (ROM), Programmable Read only Memory (PROM), Erasable Programmable Read only Memory (EPROM), Electronically Erasable Programmable Read only Memory (EEPROM), FLASH-EPROM, Compact Disc (CD)-ROM, Digital Optical Disc DVD), optical storage, optical medium, a carrier wave, magnetic cassettes, magnetic tape, magnetic disk storage or other magnetic storage devices, or any other medium which can be used to store the desired information and which can accessed by the processor.

The memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, transmission media, etc. The computer or machine readable medium can be configured to store one or more instructions thereon. The instructions can be in the form of algorithms, program logic, etc. that cause the processor to execute any of the functions disclosed herein.

Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc. Communications can be via Bluetooth, near field communications, cellular communications, telemetry communications, Internet communications, etc.

Transmission of data and signals can be via transmission media. Transmission media can include coaxial cables, copper wire, fiber optics, etc. Transmission media can also take the form of acoustic or light waves, such as those generated during radio-wave and infrared data communications, or other form of propagated signals (e.g., carrier waves, digital signals, etc.).

Any of the processors can be in communication with other processors of other devices (e.g., a computer device, a computer system, a laptop computer, a desktop computer, etc.). For instance, the processor of the LIDAR module 106 can be in communication with the processor of the image processing module 108, the processor of the LIDAR module 106 can be in communication with the processor of the controller 110, etc. Any of the processors can have transceivers or other communication devices/circuitry to facilitate transmission and reception of wireless signals. Any of the processors can include an Application Programming Interface (API) as a software intermediary that allows two or more applications to talk to each other. Use of an API can allow software of a processor of the system 100 to communicate with software of a processor of the other device(s), for example.

Some embodiments can include a processor 200 as a computer device (e.g., a laptop computer, a desktop computer, etc.) that is in communication with the detection system 100, or in communication with any component of the detection system 100. The processor 200 can be configured to generate a user interface (see e.g., FIG. 5) that allows a user (e.g., human-in-the-loop) to exercise command and control of the detection system 100 or any component thereof. For instance, the user interface can display interactive elements on a computer screen of the computer device to allow a user to transmit signals to the detection system 100 via actuation of the interactive elements. The user interface can also generate graphical elements to display functional, operational, and/or statistical aspects of the detection system 100 to allow a user to monitor aspects of the detection system 100.

The detection system 100 can include at least one light detection and ranging (LIDAR) module 106 configured to scan at least one swarm 104 (e.g., scan objects 102 of a swarm 104) and/or scan for at least one swarm 104 (scan an area to detect a swarm 104). Scan can involve inspect or search an area for a swarm 104 and/or object(s) 102 that may be associated with a swarm 104, inspect or search the swarm 104 and/or objects (s) associated with the swarm 104, etc. The LIDAR module 106 can either scan for and detect presence of the swarm 104 or receive a signal that a swarm 104 has been detected (e.g., another sensor device can detect presence of the swarm or a human-in-the-loop can detect presence of the swarm, wherein a signal is transmitted to the LIDAR module 106 directing it to being scanning the swarm 104).

Being a LIDAR module 106, the inspection or searching can involve emanating electromagnetic radiation, determining if/when any electromagnetic radiation is reflected from an object(s) 102, and receiving and analyzing electromagnetic radiation reflected by an object(s) 102. Thus, the detection system 100 can include a LIDAR module 106 configured to scan a swarm 104 of objects 102 and/or scan for a swarm 104 objects 102 to generate image data. The image data can be data related to one or more objects 102.

The detection system 100 can include at least one image processing module 108. The image processing module 108 can be configured to process the image data. In some embodiments, the image processing module 108 can be configured to control the LIDAR module 106. For instance, the image processing module 108 can be in communication with the LIDAR module 106 and transmit control signals to the LIDAR module 108. This communication link can be a direct communication or an indirect communication. For instance, the LIDAR module 106 can generate image data and transmit the image data to the image processing module 108 (this can be a pull or push operation), the LIDAR module 106 can generate image data and transmit the image data to another processor that then transmits it to the image processing module 108 (this can be a pull or push operation), and/or the LIDAR module 106 can generate image data and transmit the image data to memory that then transmits it to the image processing module 108 (this can be a pull or push operation). The image processing module 108 can be configured to process the image data for detection and/or characterization. This can be done using one or more image processing techniques (e.g., detection, segmentation, compression, visualization, recognition, restoration, pattern recognition, Gabor filtering, etc.). The one or more algorithms can be based on simple program logic, neural network based, machine learning based, etc. The image processing module 108 can then generate a control signal and transmit the same to the LIDAR module 106. As will be explained herein, some embodiments include a controller 110. In these embodiments, the image processing module 108 can transmit the processed image data to the controller 110, wherein the controller 110 generates and transmits a control signal to the LIDAR module 106.

Referring to FIGS. 6-11, the image data can be of one or more objects 102 of the swarm 104. For instance, the image data can be of a first object 102 associated with the swarm 104. The image processing module 108 can be configured to detect presence of the first object 102 in the swarm 104, wherein the image processing module 108 can focus on the first object to detect a feature of a first object 102 for which the presence has been detected. The image processing module 108 can analyze image data of the first object 102 to determine whether the object 102 includes one or more features that is/are of significance. For instance, image data of the first object 102 can reveal that the first object 102 is a type of drone, for example. It may be known that this type of drone typically has a, b, an c features. Depending on the application the system 100 is being used for, it may be important to know if the drone does in fact have feature c (e.g., a particular type of weapon or munition), or that the drone also has a feature d (e.g., a weapon, an enhanced surveillance feature, etc.).

After the feature(s) are detected, the image processing module 108 can perform additional image data analysis to characterize the feature(s) of the first object 102. This characterization can be done using foveated imaging, wide field of view imaging, narrow field of view imaging, computational imaging, digital signal processing, etc. The characterization can include visualizing, recognizing, classifying, etc. the feature so as to identify it as being a feature of importance or significance. The characterization is done to allow the image processing module 108 to identify and tag the first object 102, if desired. For instance, the swarm 104 may include plural drones, but some of the drones may be decoys so it would be beneficial to identify and tag the drones that are not decoys. As another example, the swarm 104 may include a subset of drones that if destroyed or rendered incapacitated will thwart the objective of the swarm 104 regardless of whether the other drones are still operational, and thus it would be beneficial to identify and tag the drones of the subset. This identification of drones can be done via the characterization of the feature(s) of the drones.

The image processing module 108 can be configured to initiate, based on the characterization of a feature, the LIDAR module 106 to track a first object 102 for which the presence has been detected and/or scan the swarm 104 to generate image data of a second object 102 associated with a swarm 104. For instance, if the feature of the first object 102 is determined to be of importance or significance, the image processing module 108 can generate a signal to cause the LIDAR module 106 to track the first object 102. This can include tracking the features of the first object 102. If the feature of the first object 102 is determined to not be of importance or significance, the image processing module 108 can generate a signal to cause the LIDAR module 106 to scan the swarm 104 to detect a second object 102. The feature detection and characterization of the second object 102 can occur as described above for the first object 102. This process can continue for other objects 102 and may even cause the LIDAR module 106 to analyze additional image data of an object 102 that already been analyzed. For instance, the behavior of the swarm 104 may change, and the first object 102 (previously determined to not have a feature of importance) may now have features that cause it to be of importance or significance based on that change. The LIDAR module 106 can be configured to continue to scan the swarm 104 while analyzing the object's 102 image data or while tracking an object 102, or can temporarily stop scanning the swarm 104 when doing so. It is contemplated for there to be more than one LIDAR module 106 for the detection system 100 so other LIDAR modules 106 can continue to scan the swarm 104 as one of the LIDAR modules 106 is analyzing image data of an object 102 or tacking that object 102.

Tracking an object 102 can include focusing on the object 102 by continuing (e.g., continuously, periodically, etc.) to generate image data of that object 102 for a period of time—the LIDAR module 106 can be dedicated to generating image data for that particular object 102 for the period of time. The period of time can be determined based on the behavior of the object 102 or the swarm 102. Again, it is contemplated for there to be more than one LIDAR module 106 so other LIDAR modules 106 can continue to scan the swarm 104 or track other objects 102 associated with the swarm 104 as one of the LIDAR modules 106 is focused on a particular object 102. Tracking can also include using metadata of the image data. For instance, the LIDAR module 106 can generate metadata for the image data such as timestamps, altitude, trajectory, etc. This metadata encoded image data can be stored in memory, processed by the image processing module 108, processed by another processor, etc. to develop a data set for the object(s) 102/swarm 104. For instance, the metadata encoded image data can be used to track movement of the object(s) 102/swarm 104, predict behavior patterns for the object(s) 102/swarm 104, etc.

As noted herein, the detection system 100 can be configured to scan an area to detect a swarm 104. The detection system 100 can either continuously scan an area for a swarm 104 or receive a signal to being scanning an area for a swarm 104. This signal can be from a processor (e.g., the controller 110, another sensor modality, a computer device 200 operated by a human, etc.). In addition, or in the alternative, the detection system 100 can receive a signal that a swarm 104 has been detected and to begin scanning the swarm 104. Again, this signal can be from a processor (e.g., the controller 110, another sensor modality, a computer device 200 operated by a human, etc.).

While the detection system 100 can use other sensing modalities (which will be explained later), it should be understood that it is the LIDAR sensor modality that facilitates quick and adequate feature detection and characterization so as to provide effective operation of the detection system 100. The LIDAR sensor modality can, for example, generate the image data with the resolution, speed, and accuracy to allow the detection system 100 to distinguish platforms and payloads of drones in a swarm, identify features of the drones to assess or predict behavior, etc. It is contemplated for the LIDAR module 106 to be configured to generate image data as three-dimensional (3-D) point cloud data. It is further contemplated for the LIDAR module 106 to be a solid-state LIDAR device having a microelectromechanical (MEM) control or a photonic control configured to direct an optical pulse at the object(s) 102 or swarm 104. It is contemplated for the LIDAR module 106 to natively/"raw" produce 3D point cloud data, wherein subsequent processing elements of the system 100 can derive other representations (e.g., 2D, or just "metadata"). Out outputs of the LIDAR module 106 and/or image processing module 108 can include 3D point cloud data, 2D depth maps (e.g., for each pixel, how far away is it?), 2D images segmented into regions (e.g., region 1=swarm, region 2=not swarm; e.g., region 1=subset of swarm, region 2=different subset of swarm, region 3 . . . ); 1D metadata like lists of objects found.

In some embodiments, the LIDAR module 106 and the image processing module 108 are separate units but in communication with each other. In some embodiments, the LIDAR module 106 and the image processing module 108 are configured as a unitary sensor device. Some embodiments can include a combination of separated LIDAR modules 106/image processing modules 108 and unitary sensor devices. Some embodiments can use a single image processing module 108 for one or more LIDAR modules 106, a single LIDAR module 106 in communication with one or more image processing modules 108, etc.

There can be plural LIDAR modules 106 and/or unitary sensor devices. The following discusses an example of a system 100 having plural unitary sensor devices, but it is understood that this can be similarly applied to a system 100 having plural LIDAR modules 106 and image processing modules 108 that are not configured as a unitary sensor device. The plural unitary sensor devices can include a first unitary sensor device configured to scan a first sector of a swarm 104 and a second unitary sensor device configured to scan a second sector of a swarm 104. A portion of the first sector may or may not overlap a portion of the second sector. Overlapping can be done to provide redundant coverage of areas within the swarm 104. There can be additional sensor devices, each configured to scan at least a sector of a swarm 104 and similarly be configured to overlap in sectors.

In some embodiments, the detection system 100 includes at least one controller 110. The controller 110 can be one or more processors or processing modules in communication with one or more LIDAR modules 106, image processing modules 108, unitary sensor devices, or other sensor devices 112. Use of other sensor devices 112 (e.g., a vibrational sensor, a pressure sensor, a motion sensor, a radio detection and ranging (RADAR) sensor, an acoustic sensor, a magnetic sensor, an accelerometer, an electric sensor, an optical sensor, etc.) will be discussed in more detail later. The controller 110 can receive image data from a sensor or image data from a processing module via direct or indirect communication (e.g., directly from the sensor or image processing module or from another processor that first received the image data). This can be a push or pull operation. The image data can be raw data, processed data, or a combination thereof. The controller 110 can include program instructions to process the image data for coordinating scanning, image data generation, and/or image data processing by any one or combination of LIDAR sensors, image processing modules 108, or other sensor devices 112. For instance, the controller 110 can analyze the image data and determine that additional sensors or other sensor modalities should be used to generate or augment image data about a particular object 102. As another example, the controller 110 can analyze the image data and determine that the swarm 104 has broken up into two or more swarms 104, wherein some sensors are allocated to scanning one swarm while other sensors are allocated to scanning another swarm. How to coordinate scanning, image data generation, and/or image data processing can be determined by program logic, control logic, data processing program logic, artificial intelligence programming, machine learning programming, artificial neural network programming, automated reasoning programming, etc., which can be governed by programing rules based on probabilistic analyses, objective function analyses, cost function analyses, etc.

There can be one or more controllers 110. Any one or combination of the controllers 110 can be part of the detection system 100 or be separate from the detection system 100 but be in communication with one or more components of the detection system 100. There can be one controller 110 for any one or combination of LIDAR modules 106, any one or combination of sensors 112, or any one or combination of image processing modules 108 (meaning a single controller 110 is configured to transmit signals and coordinate activities for one or more devices). There can be plural controllers 110 for a single LIDAR module 106, a single sensor 112, or a single image processing module 108 (meaning a single device can receive signals and be coordinated by plural controllers 110). Any of the LIDAR modules 106, image processing modules 108, and/or other sensors 112 can include servos or other actuators with Application Programming Interfaces (API) to allow the controller 110 to control an operation of the device.

As noted herein, any one or combination of the image processing modules 108 can generate movement data of the objects 102 in the swarm 104. The movement data can be based on position of the object 102 at different timestamps, for example. The movement data can be used to plot trajectories for the objects 102, predict trajectories for the objects 102, determine if any of the objects 102 are stationary, determine if any of the objects 102 are performing a maneuver (e.g., pitching, rolling, banking, ascending, descending, accelerating, decelerating, hovering, diving, surfacing, etc.), etc. These determinations can be performed by the image processing modules 108 and/or the controller 110. The controller 110 can coordinate scanning, image data generation, and/or image data processing based on the movement data.

In addition, the controller 110 can instruct a LIDAR module 106 to track one or more objects 102 based on feature detection and characterization made by an image processing module 108. LIDAR modules 106 tracking objects 102 can generate tracking data specific to the objects 102 being tracked. The tracking data can include movement data and feature data of the object being tracked. Thus, the controller 110 can coordinate scanning, image data generation, and/or image data processing based on movement data and tracking data of the one or more objects 102. In this regard, the detection system 100 is monitoring individual objects 102 of the swarm, targeted objects 102 (e.g., objects having features of interest) of the swarm 104, and the swarm 104 as a whole simultaneously. This can be important when attempting to predict behavior of the swarm 104, determining which objects 102 to focus on, determining which features to focus on, determining which countermeasures to use against the swarm 104, etc. It should be noted that the analysis is dynamic. Thus, the movement and tracking data can cause the controller 110 to determine that new or different features should be focused on. This can cause the controller 110 to force LIDAR modules 106 that were tracking one object 102 to no long track that object, for example.

The controller 110 can be configured to process image data, movement data, tracking data, etc. from plural LIDAR modules 106, plural image processing modules 108, plural other sensors 112, or a combination thereof via sensor fusion techniques. Again, the data can be raw data, processed data, or a combination of both. Sensor fusion can involve Kalman filtering techniques, Bayesian network techniques, Dempster-Shafer techniques, etc.

The detection system 100 can include a plurality of devices (e.g., any number of controllers 110, LIDAR modules 106, image processing modules 108, and other sensors 112). Any number of these devices can be in communication with any number of other devices via a distributed network architecture, a centralized network architecture, or a combination of both. In addition, scanning, image data generation, image data processing, and the coordination thereof can be via a centralized data processing technique, a decentralized data processing technique, or a combination of both. Which technique is used can depend on the particular application of the system 100, computational resources available, cost-benefit analyses, security concerns, the number of detection systems or sub-systems being used, etc.

In an exemplary embodiment, the detection system 100 includes a controller 110. The detection system 100 includes a sensing assembly. The sensing assembly includes a sensor device 112 (e.g., a vibrational sensor, a pressure sensor, a motion sensor, a radio detection and ranging (RADAR) sensor, an acoustic sensor, a magnetic sensor, an accelerometer, an electric sensor, an optical sensor, etc.) configured to scan an area to detect a swarm 104 of objects 102 and transmit a swarm detection signal to the controller 110. The sensing assembly includes a LIDAR sensor device (including a LIDAR module 106 and an image processing module 108) configured to receive a control signal from the controller 110 to direct an optical pulse at the swarm 104 based on the swarm detection signal. In this embodiment, the sensor device 112 is used to detect a swarm 104 whereas the LIDAR sensor device is used to scan objects 102 for object features within the swarm 104. For instance, suppose the objects 102 are drones. A RADAR sensor device 112 is used to detect presence of a swarm 104 as the RADAR sensor device 112 has a longer range than does the LIDAR sensor device. Once a swarm 104 is detected, the LIDAR sensor device can be directed (via the controller 110) to scan the swarm 104. The LIDAR sensor device is directed (via the controller 110) to scan the swarm 104 to generate image data of a first object 102 associated with the swarm 104, detect presence of the first object 102, detect a feature of the first object 102 for which presence has been detected, and characterize the feature of the first object 102. The controller 110 can, based on the characterization of the feature, cause the LIDAR sensor device to track the first object 102 for which the presence has been detected or scan the swarm 104 to generate image data of a second object 102 associated with a swarm 104.

There can be one or more sensing assemblies, and one of which can include plural LIDAR sensor devices. The controller 110 is configured to coordinate scanning, image data generation, and/or image data processing performed by the one or more sensing assemblies. Again, this can be via a sensor fusion technique. The controller 110 can be in communication with the sensing assemblies or components thereof via a distributed network architecture, a centralized network architecture, or a combination of both. Data processing can be via a centralized data processing technique, a decentralized data processing technique, or a combination of both.

As noted herein, the image processing modules 108 can generate movement data and/or tracking data. The controller 110 can be configured to process the movement data and/or the tracking data to determine trajectories for the objects 102, predict trajectories for the objects 102, determine if any of the objects 102 are stationary, determine if any of the objects 102 are performing a maneuver, etc. The controller 110 can also identify one or more formations (e.g., wedge formation, column formation, echelon formation, herringbone formation, line abreast formation, vee/vic formation, trail formation, arrowhead formation, axe formation, etc.) exhibited by the objects 102. The controller 110 can also determine/predict, based at least in part on an identified formation, behavior of one or more object 102 associated with the swarm 104, a subset of objects 102 associated with a swarm, and/or all of the objects 102 associated with a swarm 104. This can include whether a formation is being formed, whether a formation is being broken, whether an object 102/swarm 104 is engaging or breaking contact, whether an object 102/swarm 104 is responsive to a perturbation, how an object 102/swarm 104 responds to a perturbation, etc. This can be done via artificial intelligence, machine learning, etc., which may involve one or more of a multivariant analysis, a neural network analysis, or a Bayesian network analysis, etc.

Figure 5:
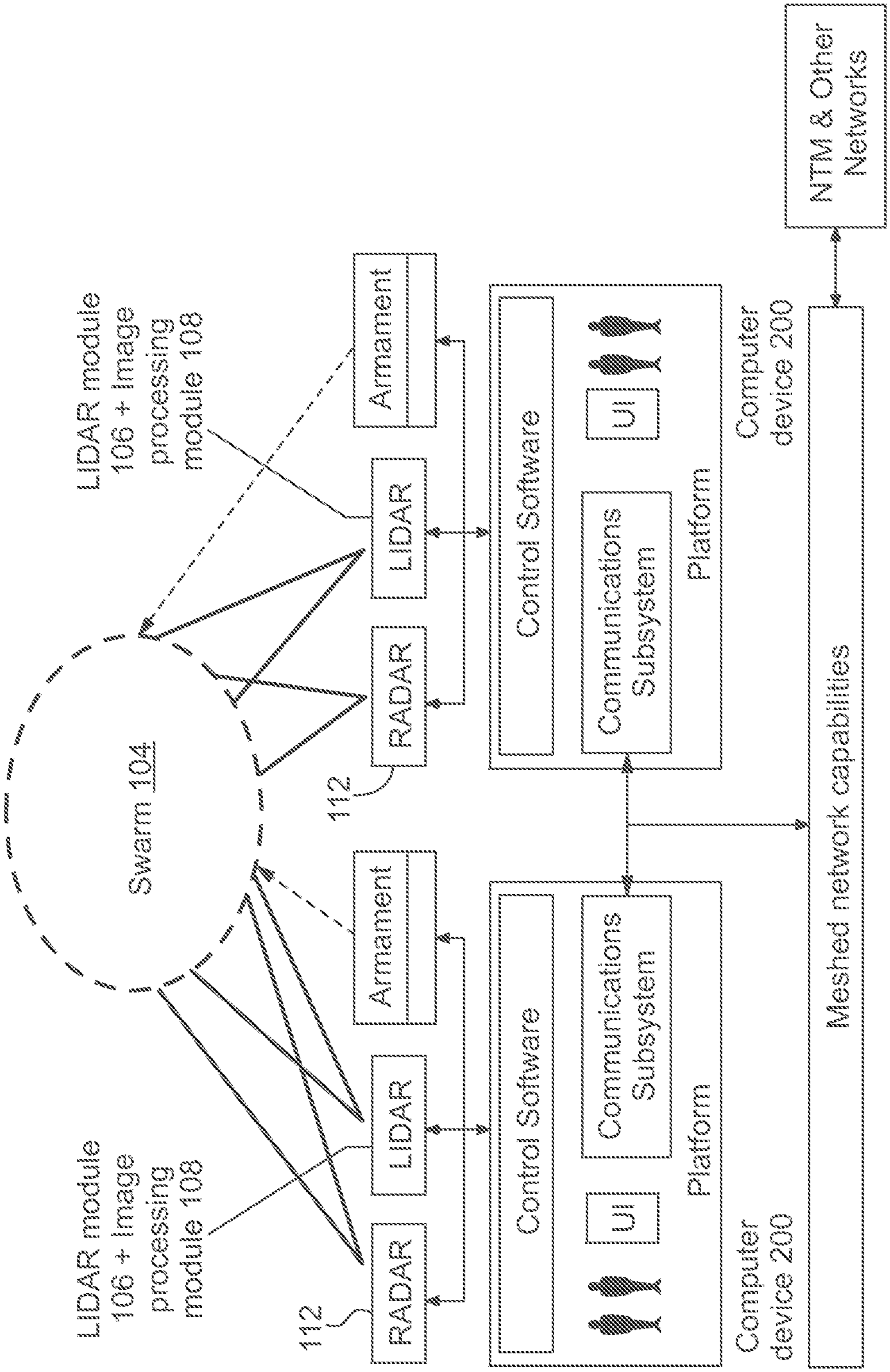
FIG. 5 shows an exemplary embodiment of a detection system configured to provide a countermeasure in response to swarm activity.
Figure 6:
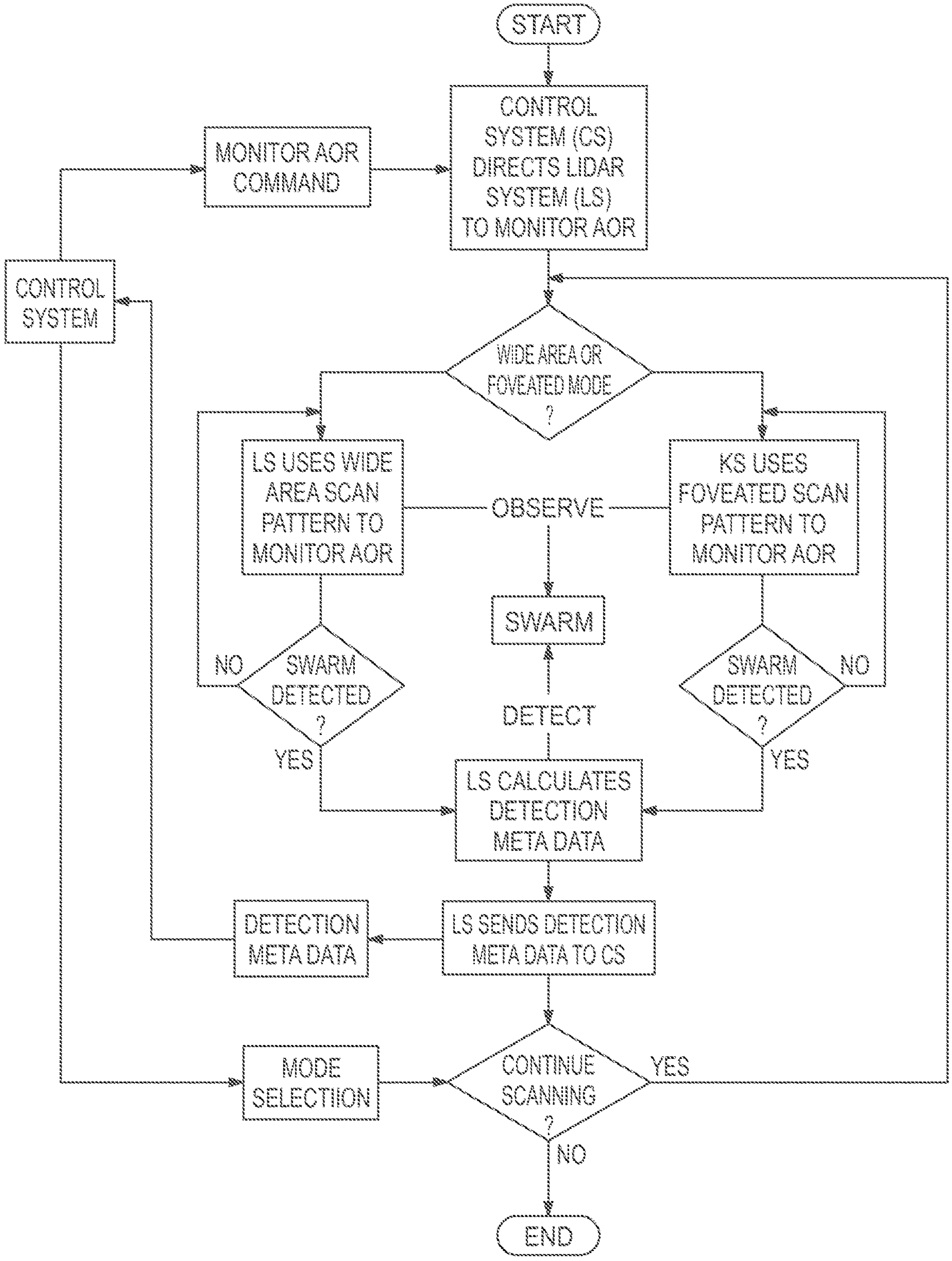
FIGS. 6-11 show exemplary process flow diagrams for scanning a swarm, generating point cloud data of an object via foveated imaging, and determining whether to direct a LIDAR device to track an object or to continue scanning a swarm based on feature characterization of the object.
Figure 7:
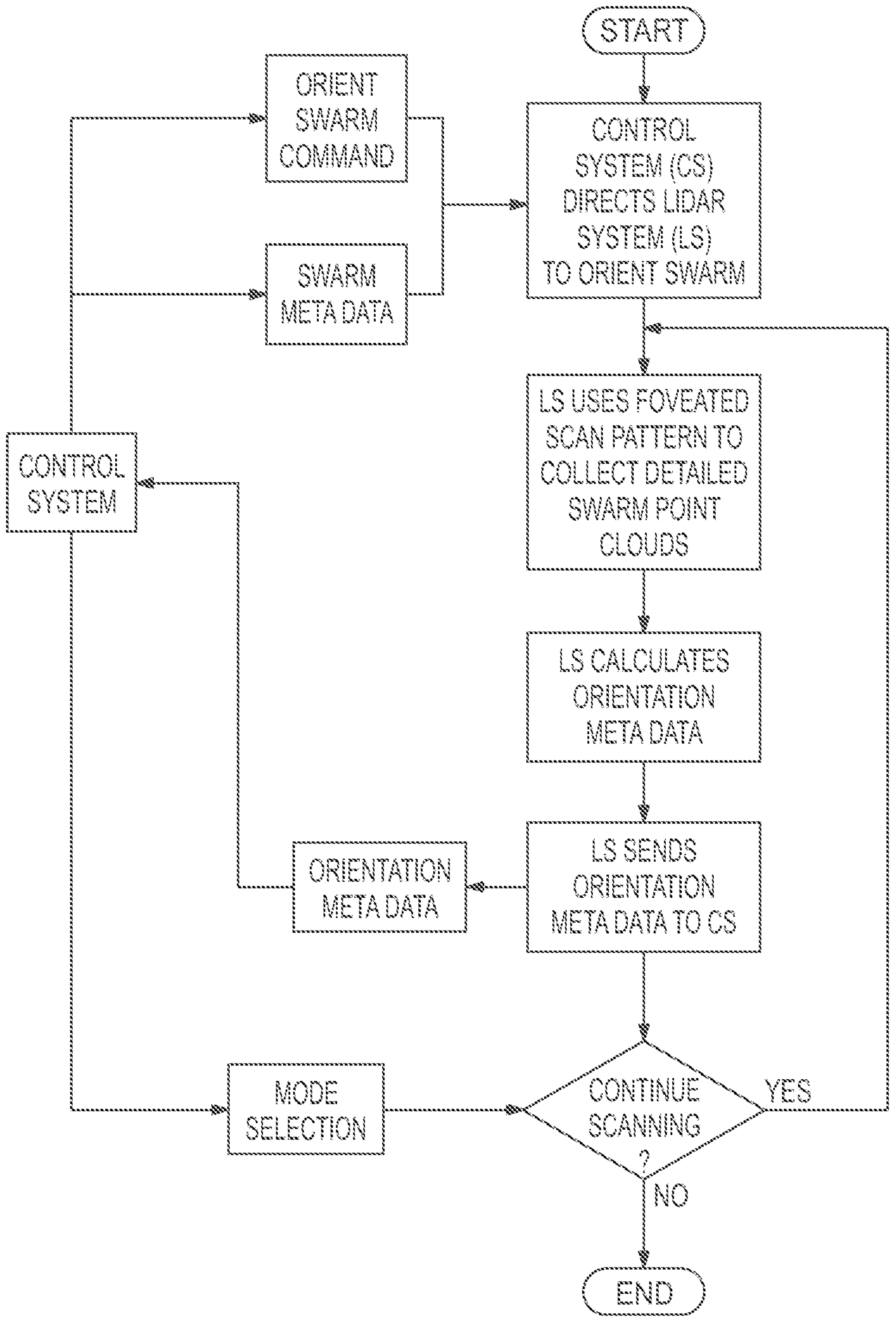
Figure 8:
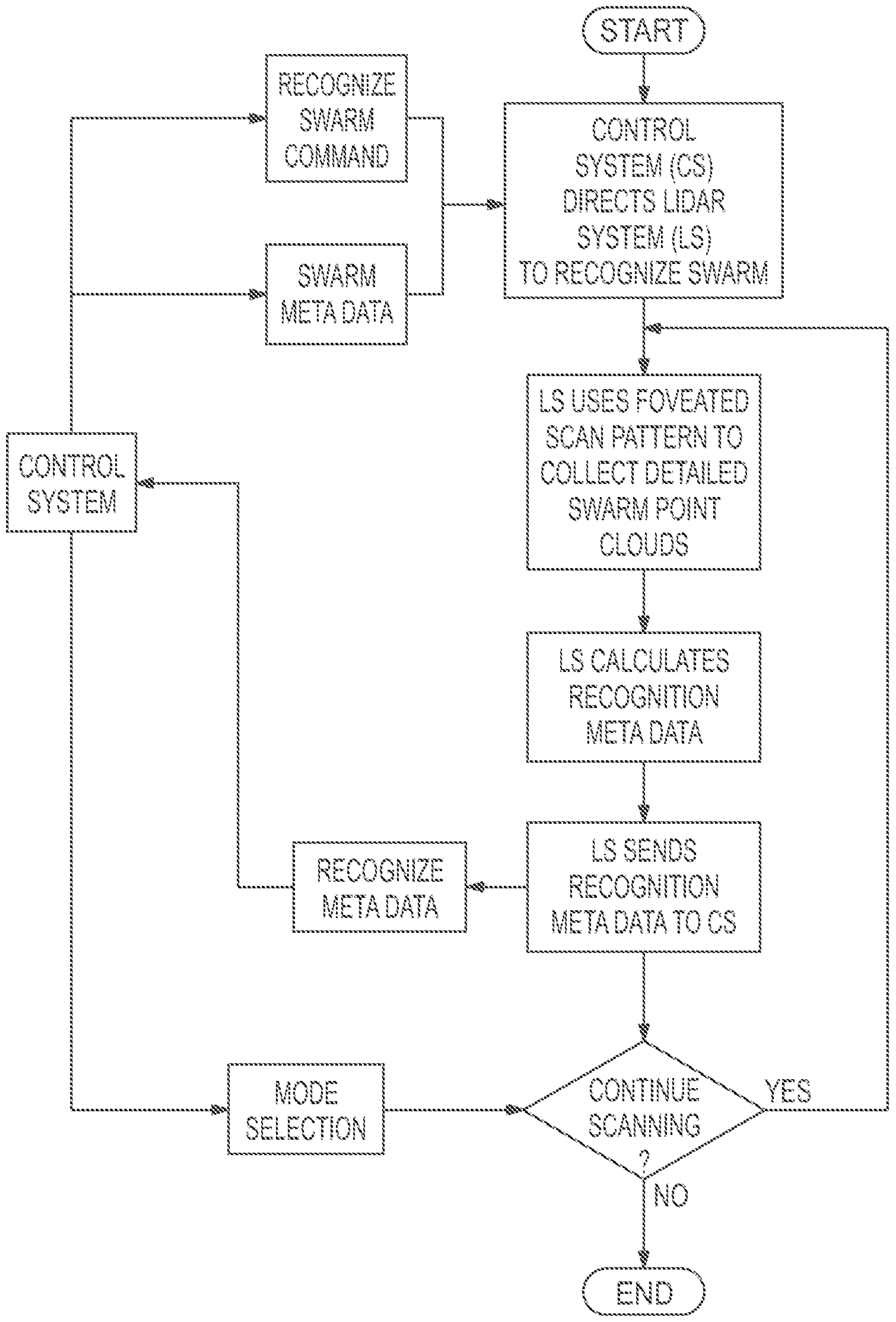
Figure 9:
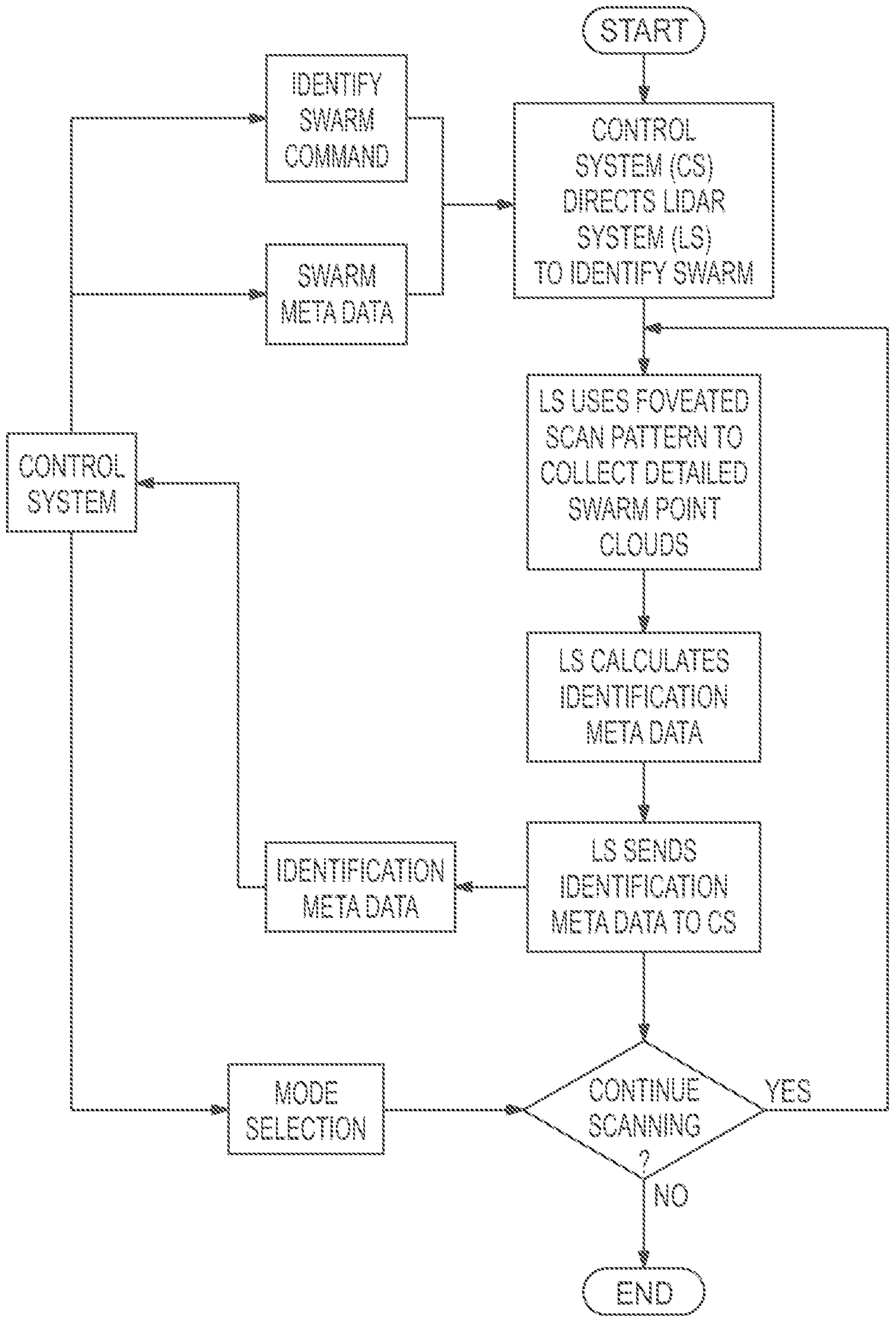
Figure 10:
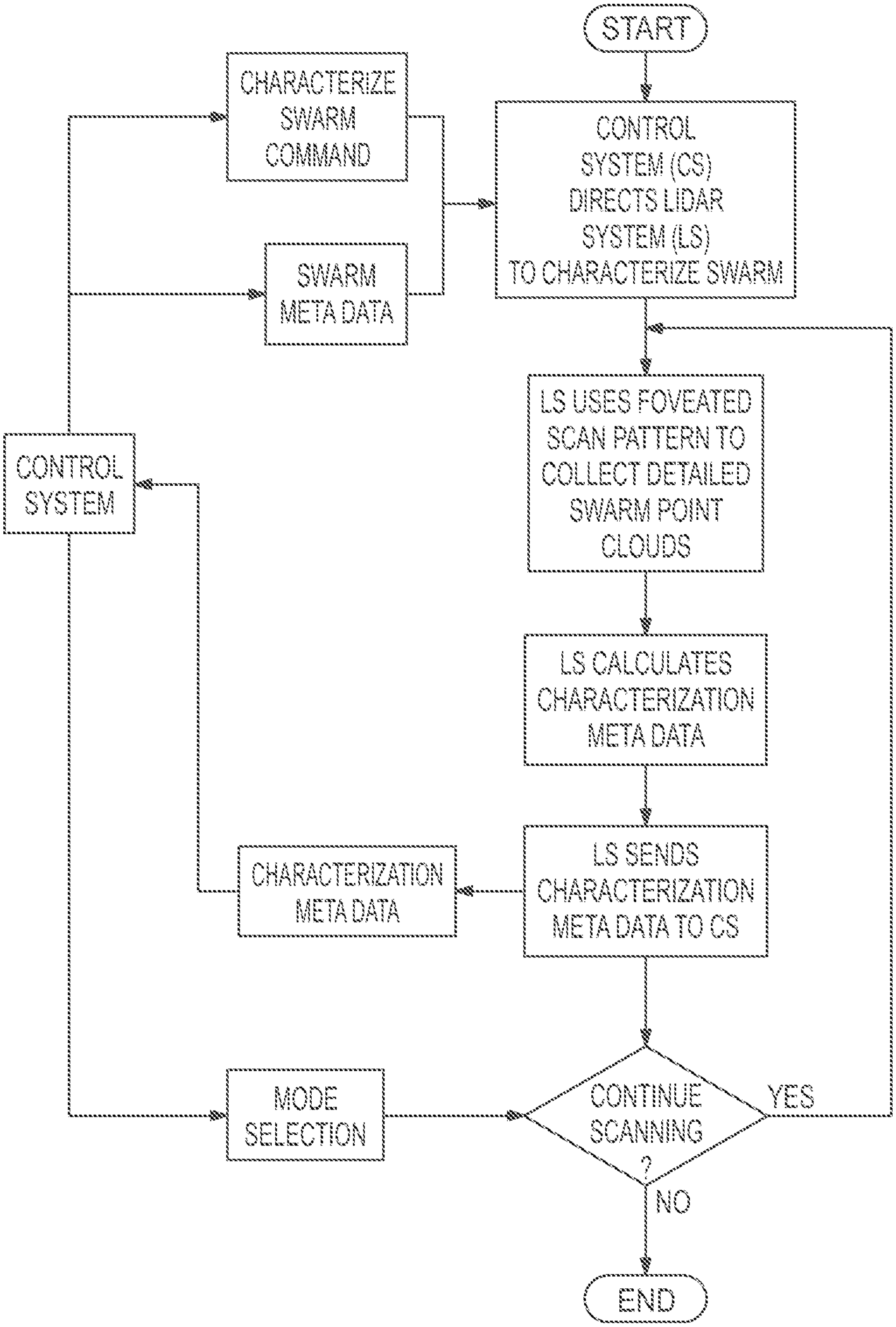
Figure 11:
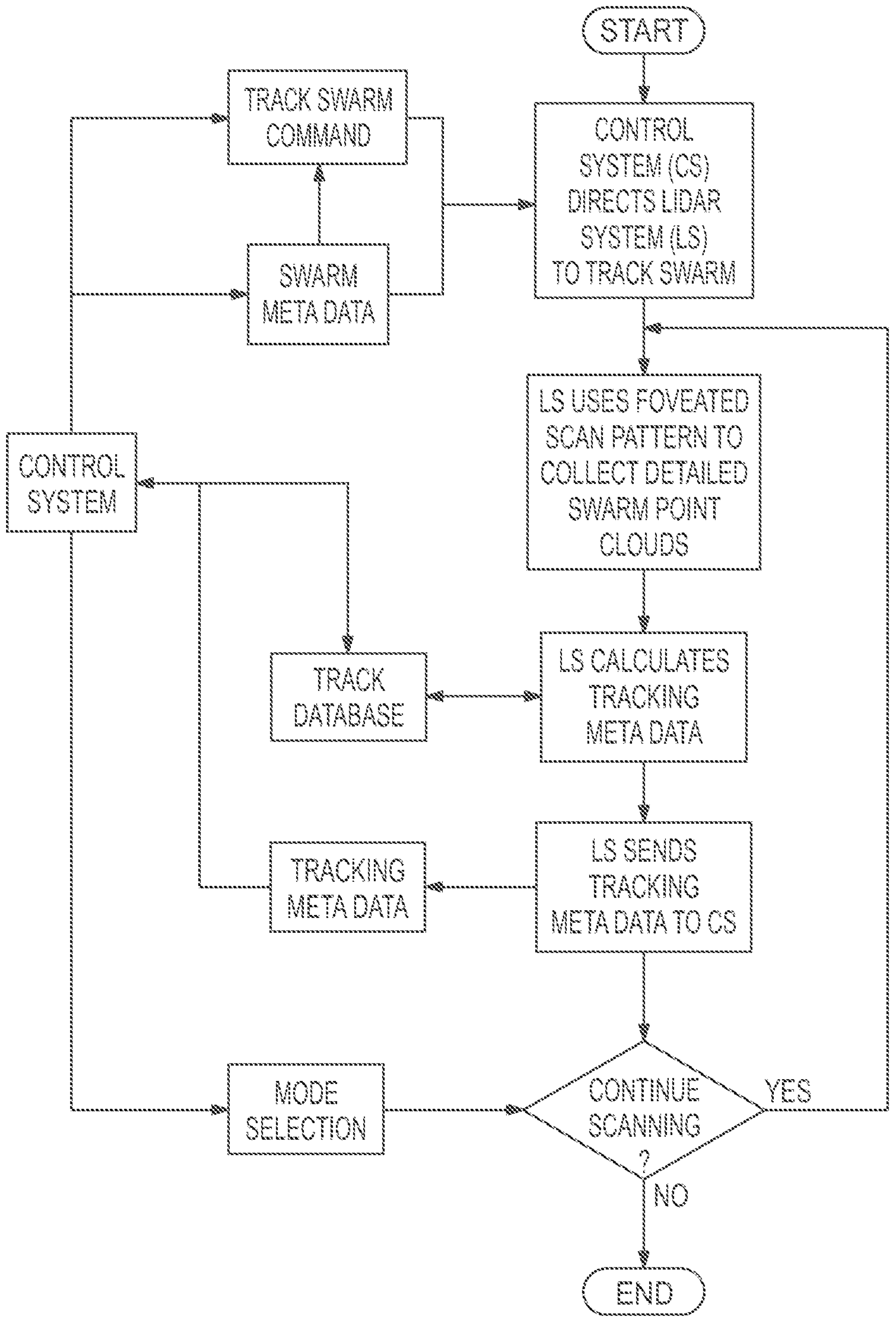

Referring to FIG. 5, some embodiments can be directed towards a swarm detection and countermeasure system 100. The system 100 can include a controller 110 and sensing assembly. The sensing assembly can include a sensor device 112 configured to scan an area to detect a swarm 104 of objects 102 and transmit a swarm detection signal to the controller 110. The sensing assembly can include plural LIDAR sensor devices, at least one LIDAR sensor device configured to receive a control signal from the controller 110 to direct an optical pulse at the swarm 104 based on a swarm detection signal. The LIDAR sensor device is configured to scan the swarm 104 to generate image data of a first object 102 associated with the swarm 104, detect presence of the first object, detect a feature of the first object 102, characterize the feature of the first object 102, and, based on the characterization of the feature, track a first object 102 or scan the swarm 104 to generate image data of a second object 102 associated with the swarm 104. The controller 110 can be configured to process movement data and/or tracking data from the plural LIDAR sensor devices to identify a formation. The controller 110 can be configured to predict behavior of an object 102 associated with the swarm 104, a subset of objects 102 associated with the swarm 104, and/or all of the objects 102 associated with the swarm 104. The controller 110 can be configured to develop a countermeasure that will disrupt the formation and/or a predicted behavior of the swarm 104 of object 102 of the swarm 104. The countermeasure can be developed via artificial intelligence, machine learning, etc. and implemented via automated reasoning, for example.

It will be understood that modifications to the embodiments disclosed herein can be made to meet a particular set of design criteria. For instance, any component of the detection system 100 can be any suitable number or type of each to meet a particular objective. Therefore, while certain exemplary embodiments of the system 100 and methods of making and using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. A detection system, comprising:

at least one light detection and ranging (LIDAR) hardware processor configured to scan a swarm of objects to generate image data of objects associated with a swarm; and at least one image processing hardware processor configured to process the image data and control the at least one LIDAR hardware processor, wherein the at least one image processing hardware processor is configured to:

detect features of objects;

characterize, using image processing, the features of the objects and identify objects of a swarm as a target object or a non-target object based on the characterization; and cause, based on the characterization, the at least one LIDAR hardware processor to simultaneously track any target objects, scan the swarm of objects, and continue to detect and characterize features of the non-target objects.

2. The detection system of claim 1, wherein:

the swarm of objects includes an ariel object, a ground object, and/or a marine object.

3. The detection system of claim 1, wherein the detection system is configured to:

scan an area to detect a swarm;

receive a signal that a swarm has been detected and to begin scanning the swarm; and/or receive a signal directing it to begin scanning an area to detect a swarm.

4. The detection system of claim 1, wherein:

the at least one LIDAR hardware processor is configured to generate image data as three-dimensional (3-D) point cloud data.

5. The detection system of claim 1, wherein the at least one LIDAR hardware processor is a solid-state LIDAR device, the solid-state LIDAR device comprising:

a microelectromechanical (MEM) control or a photonic control configured to direct an optical pulse at a swarm.

6. The detection system of claim 1, wherein the at least one LIDAR hardware processor and the at least one image processing hardware processor are configured as a unitary sensor device, comprising:

plural sensor devices, the plural sensor devices including at least a first sensor device configured to scan a first sector of a swarm and at least a second sensor device configured to scan a second sector of a swarm; and wherein a portion of a first sector overlaps a portion of a second sector.

7. The detection system of claim 6, comprising:

at least one controller including a hardware processor;

the at least one controller in communication with the plural sensor devices, the at least one controller configured to coordinate scanning and image data generation performed by the plural sensor devices; and/or at least one controller in communication with at least one sensor device and at least one other sensor device, the at least one other sensor device including any one or combination of a vibrational sensor, a pressure sensor, a motion sensor, a radio detection and ranging (RADAR) sensor, an acoustic sensor, a magnetic sensor, an accelerometer, an electric sensor, or an optical sensor;

the at least one controller being part of the detection system or a separate component of the detection system.

8. The detection system of claim 7, wherein:

the image processing hardware processors of the plural sensor devices are configured to generate movement data of the objects; and the at least one controller is configured to coordinate scanning and image data generation performed by the plural sensor devices based on movement data.

9. The detection system of claim 8, wherein:

the at least one controller is configured to coordinate scanning and image data generation performed by the plural sensor devices based on movement data and tracking data of any target objects.

10. The detection system of claim 7, wherein:

the at least one controller is configured process data from the plural sensor devices and/or the at least one other sensor device using a sensor fusion technique, wherein the data from the plural sensor devices and/or the at least one other sensor device is raw data, processed data, or a combination thereof.

11. The detection system of claim 7, wherein:

the at least one controller is in communication with the plural sensor devices via one or more of a distributed network architecture or a centralized network architecture; and/or the at least one controller is in communication with at least one sensor device and at least one other sensor device via one or more of a distributed network architecture or a centralized network architecture.

12. The detection system of claim 7, wherein:

the at least one controller and/or the plural sensor devices is configured to perform scanning and image data generation via one or more of a centralized data processing technique or a decentralized data processing technique; and/or the at least one controller, the at least one sensor device, and/or the at least one other sensor device is configured to perform scanning and image data generation via one or more of a centralized data processing technique or a decentralized data processing technique.

13. A detection system, comprising:

at least one controller including a hardware processor;

at least one sensing assembly including:

at least one sensor device configured to scan an area to detect a swarm of objects and transmit a swarm detection signal to the at least one controller;

at least one light detection and ranging (LIDAR) sensor device configured to receive a control signal from the at least one controller to direct an optical pulse at a swarm based on a swarm detection signal, wherein at least one the LIDAR sensor device is configured to:

scan a swarm to generate image data of objects associated with a swarm;

detect features of objects;

characterize, using imaging processing, the features of the object and identify objects of a swarm as a target object or a non-target object based on the characterization; and based on the characterization, simultaneously track any target objects, scan the swarm of objects, and continue to detect and characterize features the non-target object.

14. The detection system of claim 13, wherein:

the at least one sensing assembly includes plural LIDAR sensor devices; and the at least one controller is configured to coordinate scanning and image data generation performed by the at least one sensing assembly.

15. The detection system of claim 14, wherein:

the at least one controller is configured process data from the plural LIDAR sensor devices and/or the at least one sensing device using a sensor fusion technique.

16. The detection system of claim 14, wherein:

the at least one controller is in communication with the plural LIDAR sensor devices and/or the at least one sensing device via one or more of a distributed network architecture or a centralized network architecture.

17. The detection system of claim 14, wherein:

the controller, the plural LIDAR sensor devices, and/or the at least one sensing device is configured to perform scanning and image data generation via one or more of a centralized data processing technique or a decentralized data processing technique.

18. The detection system of claim 13, wherein:

the at least one controller is configured to process movement data from the plural LIDAR sensor devices to:

identify a formation; and predict, based at least in part on an identified formation, behavior of at least one object associated with the swarm, a subset of objects associated with a swarm, and/or all of the objects associated with a swarm.

19. The detection system of claim 18, wherein:

the at least one controller processes the movement data via one or more of a multivariant analysis, a neural network analysis, or a Bayesian network analysis.

20. A swarm detection and countermeasure system, comprising:

at least one controller including a hardware processor;

at least one sensing assembly including:

at least one sensor device configured to scan an area to detect a swarm of objects and transmit a swarm detection signal to the at least one controller;

plural light detection and ranging (LIDAR) sensor devices, at least one LIDAR sensor device configured to receive a control signal from the at least one controller to direct an optical pulse at a swarm based on a swarm detection signal, wherein the at least one LIDAR sensor device is configured to:

scan a swarm to generate image data of objects associated with a swarm;

detect features of the objects;

characterize, using image processing, the features of the objects and identify objects of a swarm as a target object or a non-target object based on the characterization; and based on the characterization of the feature, simultaneously track any target objects, scan the swarm of objects, and continue to detect and characterize features the non-target objects;

wherein the at least one controller is configured to process movement data from the plural LIDAR sensor devices to:

identify a formation; and predict behavior of at least one object, a subset of objects associated with a swarm, and/or all of the objects associated with a swarm;

wherein the at least one controller is configured, via an automated reasoning technique, to develop a countermeasure that will disrupt a formation and/or a predicted behavior.

* * * * *